United States Patent
Atobe

(10) Patent No.: US 7,508,536 B2
(45) Date of Patent: Mar. 24, 2009

(54) IMAGE PROCESSING SYSTEM AND METHOD

(75) Inventor: Hiroshi Atobe, Surrey (GB)

(73) Assignee: Canon Kabushiki Kaisha, Tokyo (JP)

( * ) Notice: Subject to any disclaimer, the term of this patent is extended or adjusted under 35 U.S.C. 154(b) by 896 days.

(21) Appl. No.: 10/966,216

(22) Filed: Oct. 15, 2004

(65) Prior Publication Data

US 2005/0088687 A1 Apr. 28, 2005

(30) Foreign Application Priority Data

Oct. 17, 2003 (JP) .............................. 2003-358034

(51) Int. Cl.
*G06F 3/12* (2006.01)
*G06K 15/00* (2006.01)

(52) U.S. Cl. ...................................... 358/1.15; 358/1.14

(58) Field of Classification Search ................ 358/1.15, 358/1.14, 1.6, 1.13, 1.16, 1.17, 1.18, 1.1, 358/1.2, 1.9, 1.11, 400, 401, 405, 407, 437, 358/468, 474, 435, 438; 709/203; 713/150; 380/243, 255; 705/50, 51, 405; 347/2, 3, 347/5, 14, 23; 399/1, 8, 366
See application file for complete search history.

(56) References Cited

U.S. PATENT DOCUMENTS

2002/0051201 A1* 5/2002 Winter et al. .............. 358/1.16
2002/0133705 A1 9/2002 Tagashira

FOREIGN PATENT DOCUMENTS

| JP | 2001-203879 A | 7/2001 |
| JP | 2002-297451 A | 10/2002 |
| WO | 00-58811 A1 | 10/2000 |

* cited by examiner

*Primary Examiner*—Dov Popovici
(74) *Attorney, Agent, or Firm*—Canon U.S.A. Inc., I.P. Division

(57) ABSTRACT

A multifunction printer, connected to a digital rights management (DRM) system through a network, has a reader unit for reading a document or a photograph as an image. The multifunction printer transmits data of the image to the DRM system. The DRM system converts the received image data into data in a DRM format. The multifunction printer enters the converted image data into a digital image data database and/or transmits the data to a destination.

14 Claims, 11 Drawing Sheets

IMAGE PROCESSING SYSTEM AND METHOD

This application claims priority from Japanese Patent Application No. 2003-358034 filed Oct. 17, 2003, which is hereby incorporated by reference herein.

BACKGROUND OF THE INVENTION

1. Field of the Invention

The present invention relates to an image processing system capable of communicating with a server such as a digital rights management (DRM) system.

2. Description of the Related Art

The amount of images (e.g., photographic images) being sold and distributed over communication networks is rapidly increasing. One reason for this increase is the availability of application software and advanced printing technology that provides higher image resolution. As resolution becomes higher, the amount of digital image data distributed over such communication networks keeps increasing.

Along with increased distribution of digital image data, the need for copyright protection has become significant. Further, this increased distribution has also resulted in the complexity of image data processing systems, making it more difficult to provide copyright protection mechanisms for distributed image data.

Japanese Patent Laid-Open No. 2002-335397 (corresponding US Patent Application Publication No. 2002-0133705) discloses a system capable of preventing the unauthorized use, copying and distribution of copyrighted image data.

One example of systems developed for copyright protection of image data includes a digital rights management (DRM) system using a high-resolution and high-quality image format, known as a VFZ format (DRM format). The DRM format has an advantage in that an image can be maintained with high resolution in a small data capacity by using a special compression technique.

In the DRM system, data files, in each of which encrypted data in the DRM format is user ID and password protected, are linked with a management server for managing the data files. The operation of a data file can be restricted. For example, the data file can be opened, closed, enlarged, or reduced. The quality level of an image, included in the data file, to be displayed or printed can be set. The image can also be stored and/or printed.

It is expected that data distribution will occur using systems other than traditional transfer devices. For example, it is more convenient to use devices located in offices and convenience stores as means for data distribution.

More specifically, a multifunction printer (MFP) located in, e.g., an office can print a read document and also convert the read document into image data and then transmit the data to another device.

Upon transmission, however, copyright protection mechanisms are needed to prevent unauthorized duplication of transmitted image data. Furthermore, users should be able to easily generate, distribute, and/or enter copyrighted image data.

SUMMARY OF THE INVENTION

An advantage of the present invention is that data of a read image can be transmitted to a server, which implements copyright protection and thereafter the data is transmitted by the server, to a destination specified by a user, thus enabling the user to easily generate, distribute, and/or enter the copyrighted image data.

According to one aspect of the present invention, an image processing system capable of communicating with a server for protecting content of data is provided. The system includes a reading unit configured to read an image; a destination specifying unit configured to allow a user to specify the destination of data of the image read through the reading unit; a first data transmitting unit configured to transmit the data of the image read through the reading unit to the server; a data receiving unit configured to receive the data protected by the server; and a second data transmitting unit configured to transmit the data received through the data receiving unit to the destination specified by the user.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the present invention will now be described in detail in accordance with the accompanying drawings.

First Embodiment

Figure 1:
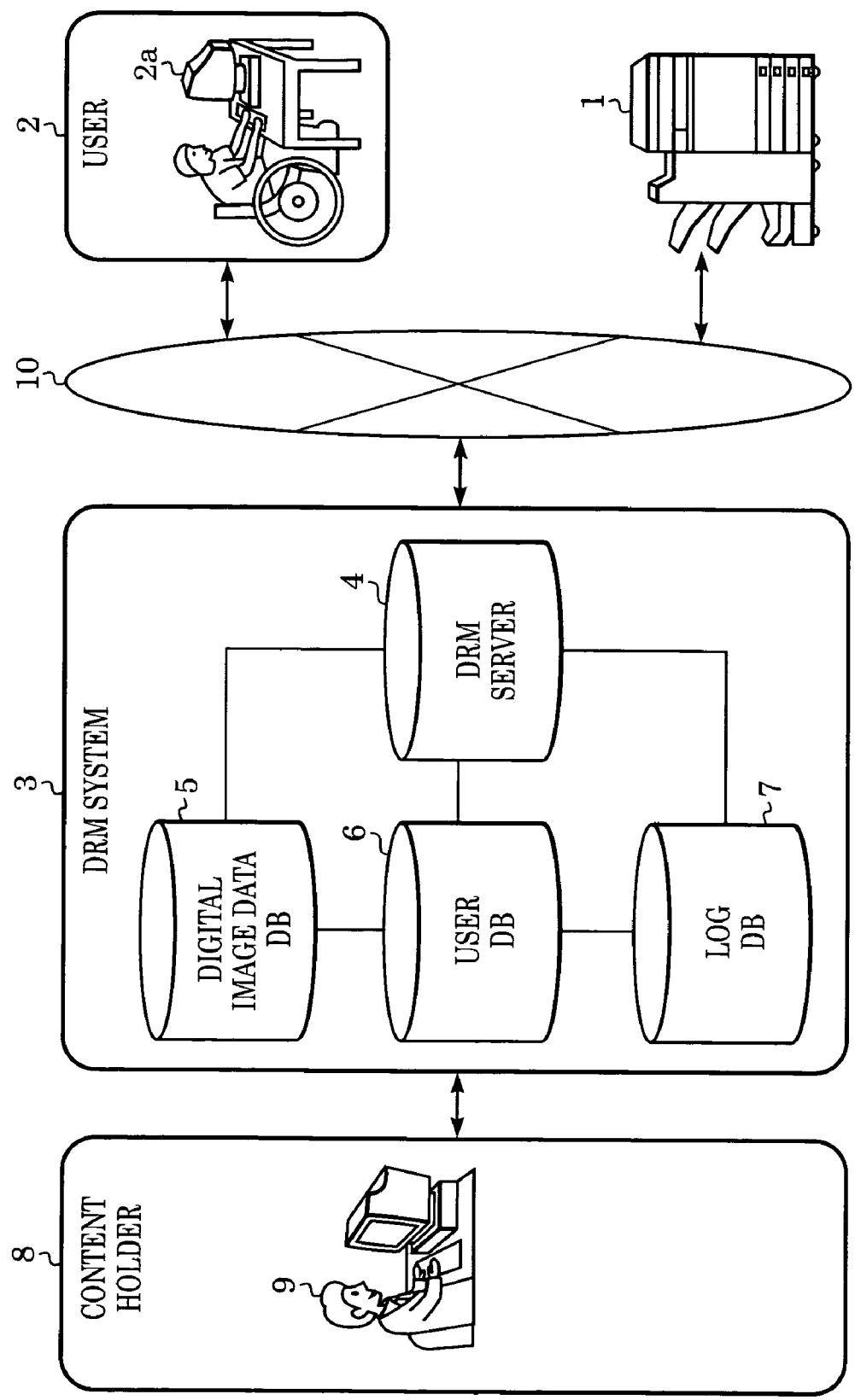
FIG. 1 is a block diagram of the structure of an image processing system including an image processing system according to a first embodiment of the present invention.

FIG. 1 shows the structure of an image processing system including an image processing system according to a first embodiment of the present invention.

Referring to FIG. 1, a multifunction printer (MFP) 1 includes a plurality of functions such as a print function, a copy function, a facsimile function, and an image reading function. A user 2 has a user ID and a password. The user 2 can search digital image data (hereinbelow, simply referred to as image data) on public view over a network 10 through a client personal computer (PC) 2a and purchase the image data. The user 2 can use the MFP 1 and a digital rights management (DRM) system 3, which will be described below, over the network 10 through the client PC 2a.

Generally, the DRM system 3 protects copyrighted image data to be provided to users over the network. The DRM system 3 includes a DRM server 4, a digital image data database (DB) 5, a user DB 6, and a log DB 7.

The DRM server 4 functions as a server computer for controlling the DRM system 3. The digital image data DB 5 stores image data. On the basis of user information, which will be described below, the DRM server 4 restricts access to image data files in the digital image data DB 5 by the user 2 through the client PC 2a over the network 10.

The user DB 6 stores user information including the access right of the user 2 to image data, detail access restriction to contents managed by the DRM system 3, and billing information for the user 2. The detail access restriction to contents managed by the DRM system 3 includes the maximum enlargement ratio for viewing or printing any content, a quality level for viewing or printing the content (the quality level includes a plurality of grades), whether the content can be printed, and whether the content can be externally stored. The billing information for the user 2 includes a purchase price of image data and billing for the use of image data.

The log DB 7 stores log information, i.e., the parameters of access to the DRM system 3 by the user 2, for example, the user ID, the time of access, the address of the user, and the reduction ratio of externally stored or printed image data.

A content holder 8 includes a company (for example, a television station, a film distributor, a record company, or a publishing company) or an individual (e.g. author) that has at least one content such as a picture or a music piece and the copyright of the content. The content holder 8 manages image data in the digital image data DB 5 and user information in the user DB 6.

A DRM client 9 is a client computer through which the company or individual enters image data into the digital image data DB 5, enters user information into the user DB 6, obtains billing information for the user 2 from the user DB 6, and/or obtains log information from the log DB 7.

Figure 2:
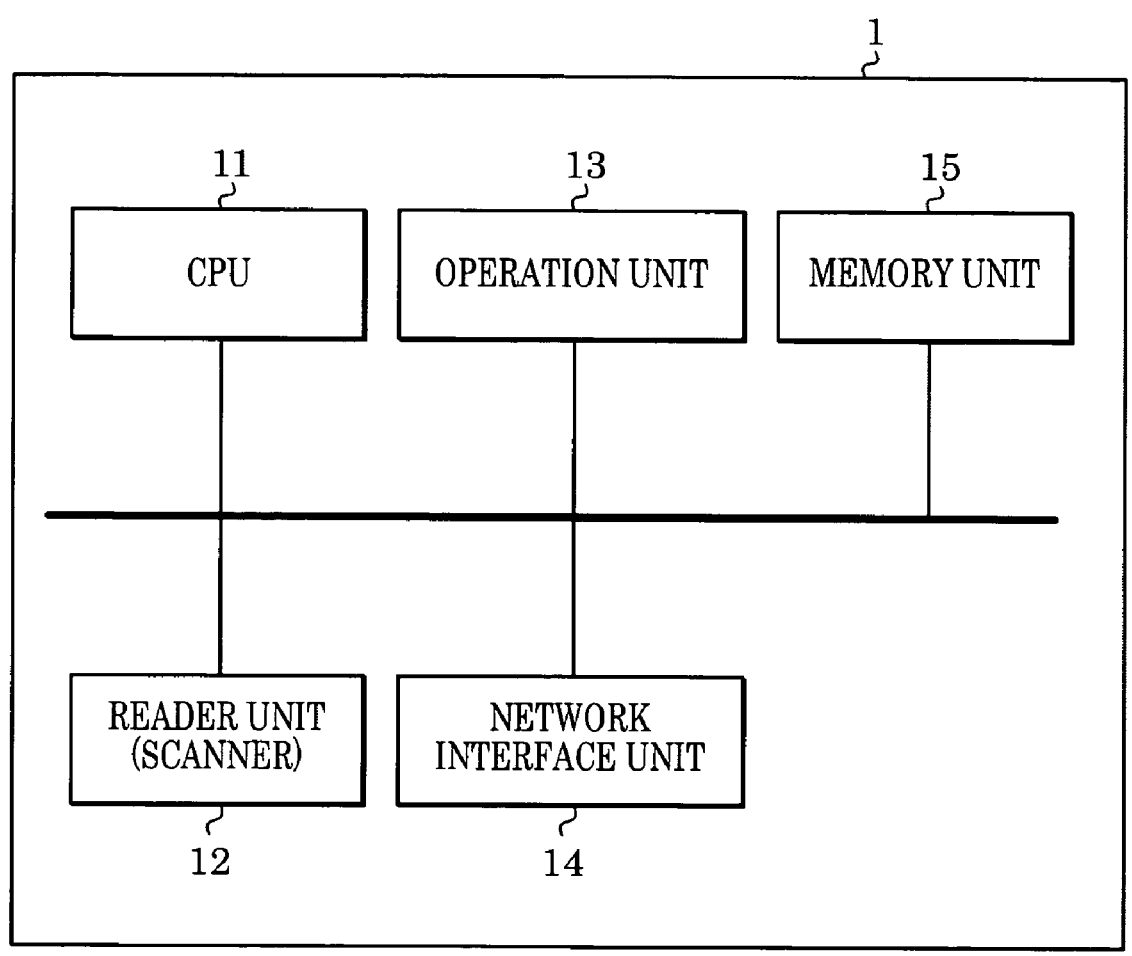
FIG. 2 is a schematic block diagram of the hardware configuration of a multifunction printer (MFP) 1 in FIG. 1.

FIG. 2 is a schematic block diagram of the hardware configuration of the MFP 1 in FIG. 1.

Referring to FIG. 2, the MFP 1 includes a CPU 11, a reader unit 12 (scanner), an operation unit 13, a network interface unit 14, and a memory unit 15.

The CPU 11 controls the operations of the respective units in the MFP 1. The reader unit 12 functions as a scanner for reading a document or a photograph as an image. The operation unit 13 includes keys and buttons, which can be operated by the user (hereinbelow, simply referred to as an MFP user), who uses the MFP 1. The operation unit 13 further includes a light emitting diode (LED) and a liquid crystal display (LCD) serving as displays. The network interface unit 14 is connected to the network 10 for transmission and reception of data. The memory unit 15 includes a random access memory (RAM), a read only memory (ROM), and a hard disk (HDD). The memory unit 15 temporarily stores image data and stores data and a program of a process, which will be described below.

Figure 3:
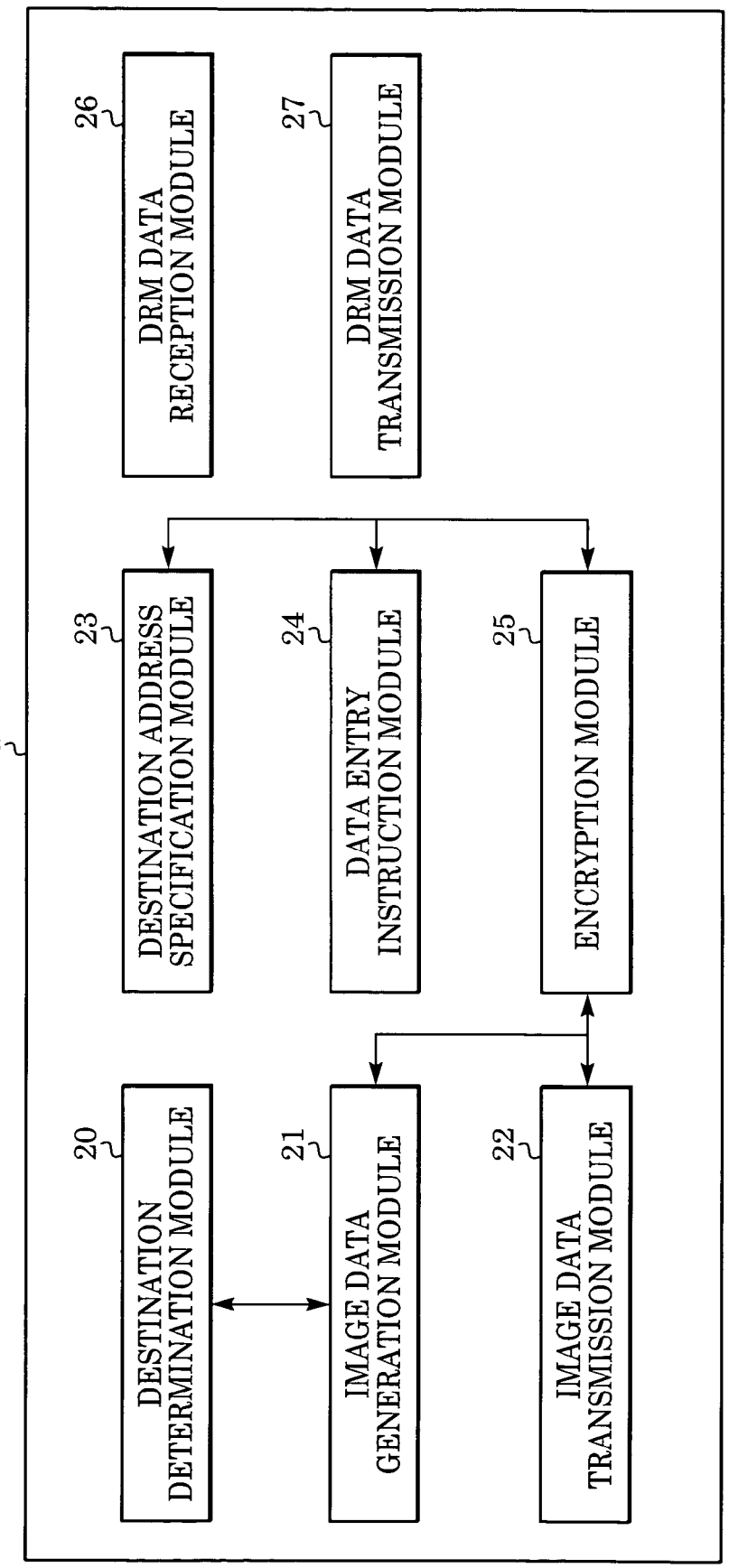
FIG. 3 is a schematic block diagram of the software configuration of the MFP in FIG. 1.

FIG. 3 is a schematic block diagram of the software configuration of the MFP 1 in FIG. 1.

Referring to FIG. 3, the MFP 1 includes a destination determination module 20, an image data generation module 21, an image data transmission module 22, a destination address specification module 23, a data entry instruction module 24, an encryption module 25, a DRM data reception module 26, and a DRM data transmission module 27.

The destination determination module 20 has a function for determining the destination of image data of a document read by the reader unit 12. Specifically, the destination determination module 20 determines whether image data of a document read through the reader unit 12 is transmitted to the user 2 specified by the MFP user and determines whether the image data is entered into the digital image data DB 5 after the image data is transmitted to the user 2. Alternatively, the module 20 determines whether the image data is entered into the digital image data DB 5 without being transmitted to the user 2.

The image data generation module 21 has a function for converting image data of a document read through the reader unit 12 into transmission data in a transmission specific format such as a TIFF format or a JPEG format. The destination address specification module 23 has a function for specifying the destination of image data on the basis of information (for example, a destination address) input through the operation unit 13 by the MFP user.

The data entry instruction module 24 has a function for instructing the DRM server 4 to enter the transmitted image data into the digital image data DB 5 when the destination determination module 20 determines the entry of the image data into the digital image data DB 5. The encryption module 25 has a function for encrypting image data generated by the image data generation module 21. The image data transmission module 22 transmits image data encrypted through the encryption module 25 to the DRM server 4.

The DRM data reception module 26 has a function for communicating with the DRM server 4 to receive image data in a DRM format converted through the DRM server 4. The DRM data transmission module 27 has a function for transmitting image data in the DRM format, which is received from the DRM data reception module 26, to an address specified by the destination address specification module 23.

Figure 4:
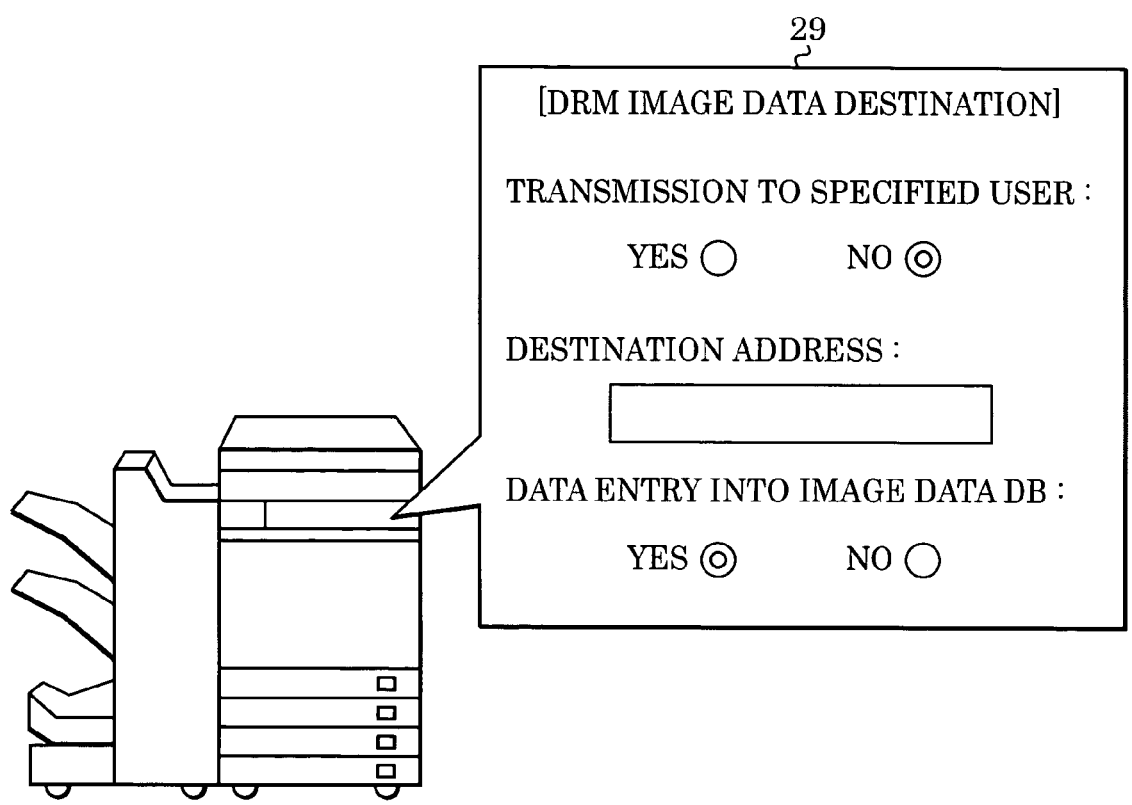
FIG. 4 is a diagram showing an example of a screen displayed on an operation unit of the MFP.

FIG. 4 is a diagram showing an example of a screen displayed in the operation unit 13 of the MFP 1.

Referring to FIG. 4, a DRM image data destination specification screen 29 is displayed in the operation unit 13 to specify the destination of image data. The screen is displayed on the LCD (not shown). In the present screen, the MFP user can select whether image data is transmitted to the user 2 or not. The MFP user may check a box "YES" or "NO" in "TRANSMIT TO SPECIFIED USER". If the MFP user checks the box "YES", the user is prompted to input the mail address of a destination user in a blank field for the destination address using the keys (not shown) in the operation unit 13.

On the DRM image data destination specification screen 29, the MFP user can select whether the image data is entered into the digital image data DB 5 or not. The MFP user may check a box "YES" or "NO" in "ENTER DATA INTO IMAGE DB". The selection in "TRANSMIT TO SPECIFIED USER" and that in "ENTER DATA INTO IMAGE DB" are controlled independently of each other.

An image data entry process executed by the image processing system in FIG. 1 will now be described with reference to FIGS. 5 and 6.

Figure 5:
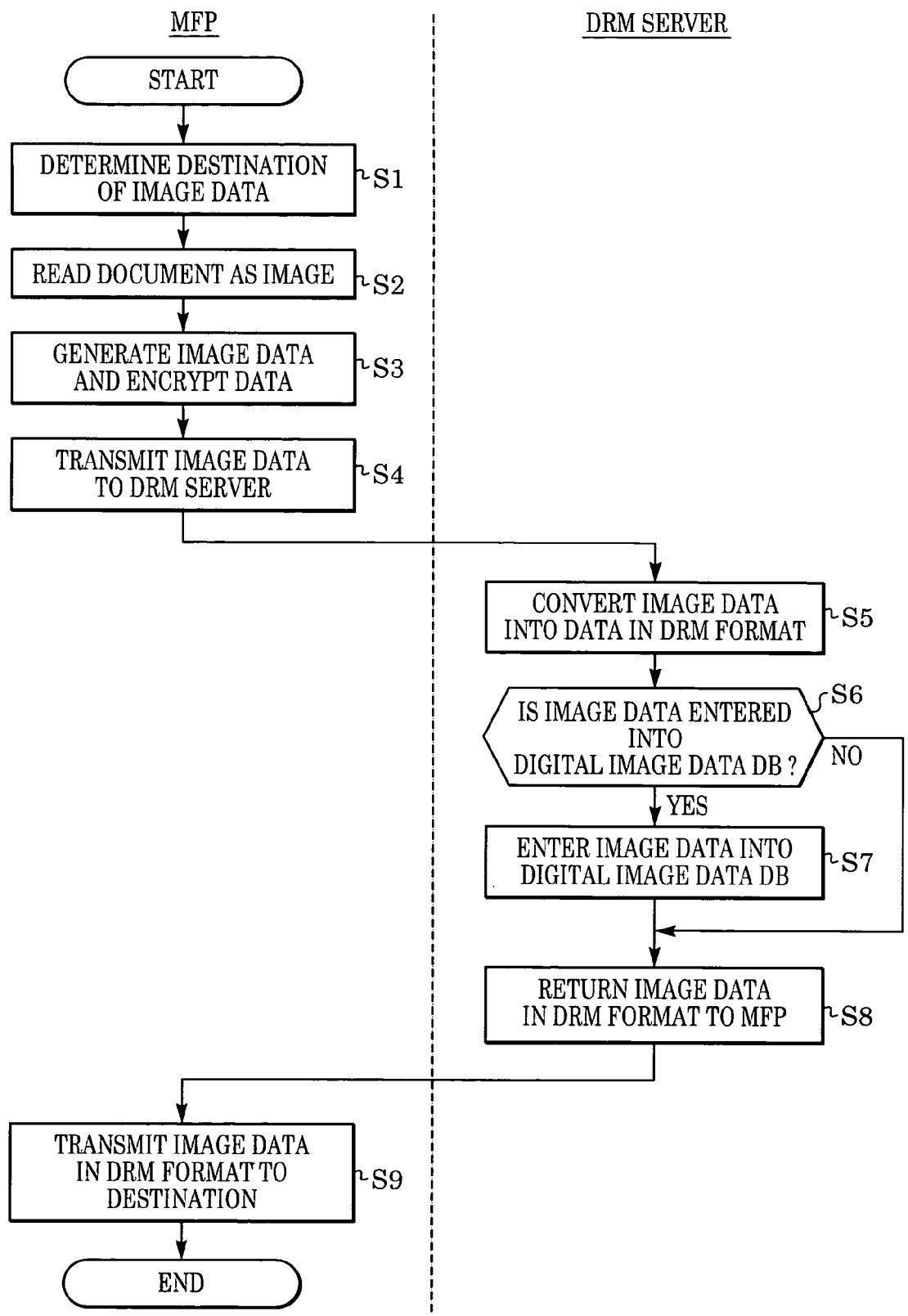
FIG. 5 is a flowchart of an image data entry process executed in the image processing system in FIG. 1.

FIG. 5 is a flowchart of the image data entry process executed by the image processing system in FIG. 1. FIG. 6 is a diagram showing image data flow in the process of FIG. 5.

Figure 6:
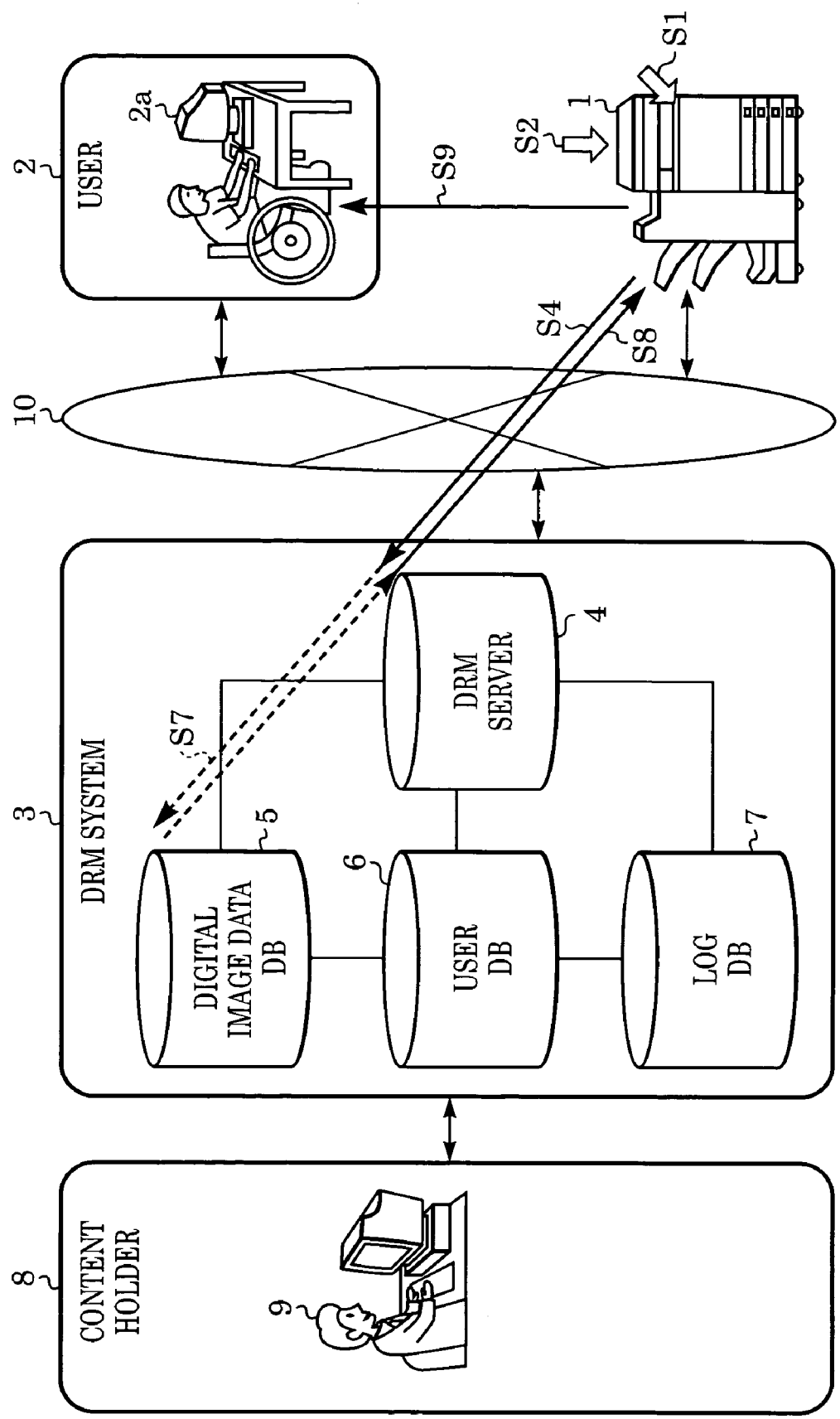
FIG. 6 is a diagram showing the flow of image data in the process of FIG. 5.

Referring to FIG. 5, in the MFP 1, when the MFP user specifies the destination of image data of a document to be read by the reader unit 12 on the DRM image data destination specification screen 29 displayed in the operation unit 13, the destination determination module 20 determines the destination of the image data (step S1) (S1 of FIG. 6).

Subsequently, the reader unit 12 reads the document as an image (step S2) (S2 of FIG. 6). The image data generation module 21 generates transmission data in a TIFF format or a JPEG format from the image read by the reader unit 12. The encryption module 25 encrypts the generated transmission data and temporarily stores the encrypted data into the memory unit 15 (step S3). After that, the image data transmission module 22 transmits the encrypted transmission data (image data) to the DRM server 4 (step S4) (S4 of FIG. 6).

The DRM server 4 converts the image data received from the MFP 1 into image data in the DRM format (step S5). Subsequently, the DRM server 4 determines whether the digital image data DB 5 is selected as the determined destination of the image data, namely, whether the image data is entered into the digital image data DB 5 (step S6). As a result of this determination, if the image data is entered into the digital image data DB 5 (YES in step S6), the image data converted in the DRM format is entered into the digital image data DB 5 (step S7) (S7 of FIG. 6). Then, the image data is returned to the MFP 1 (step S8) (S8 of FIG. 6).

If the image data is not entered into the digital image data DB 5 in step S6 (NO in step S6), the image data in the DRM format is returned to the MFP 1 without being entered into the digital image data DB 5 (step S8) (S8 of FIG. 6).

In the MFP 1, the DRM data reception module 26 receives the image data in the DRM format. The image data transmission module 22 transmits the image data to the destination address of the user 2 specified by the MFP user in step S1 (step S9) (S9 of FIG. 6) after which the process is ended.

According to the first embodiment, upon instructing the transmission of image data of a document or a photograph read through the reader unit 12 to the destination and/or the entry of the image data into the digital image data DB 5 in the DRM system 3, the image data of the read document is transmitted from the MFP 1 to the DRM system 3, and the image data is converted into data in the DRM format in the DRM system 3. Then, the converted image data is entered into the digital image data DB 5 and/or is transmitted to the destination. In other words, copyright violations of image data of a document read through the MFP 1 can be prevented by using the DRM system 3 for preventing the unauthorized copying and use of image data. The image data can be managed according to the operation of the existing DRM system 3. Thus, the MFP user can easily generate, distribute, and/or enter image data through the operation unit 13 of the MFP 1.

Second Embodiment

The structure of an image processing system according to a second embodiment of the present invention is similar to that of the first embodiment and components different from those of the first embodiment are described below.

Figure 7:
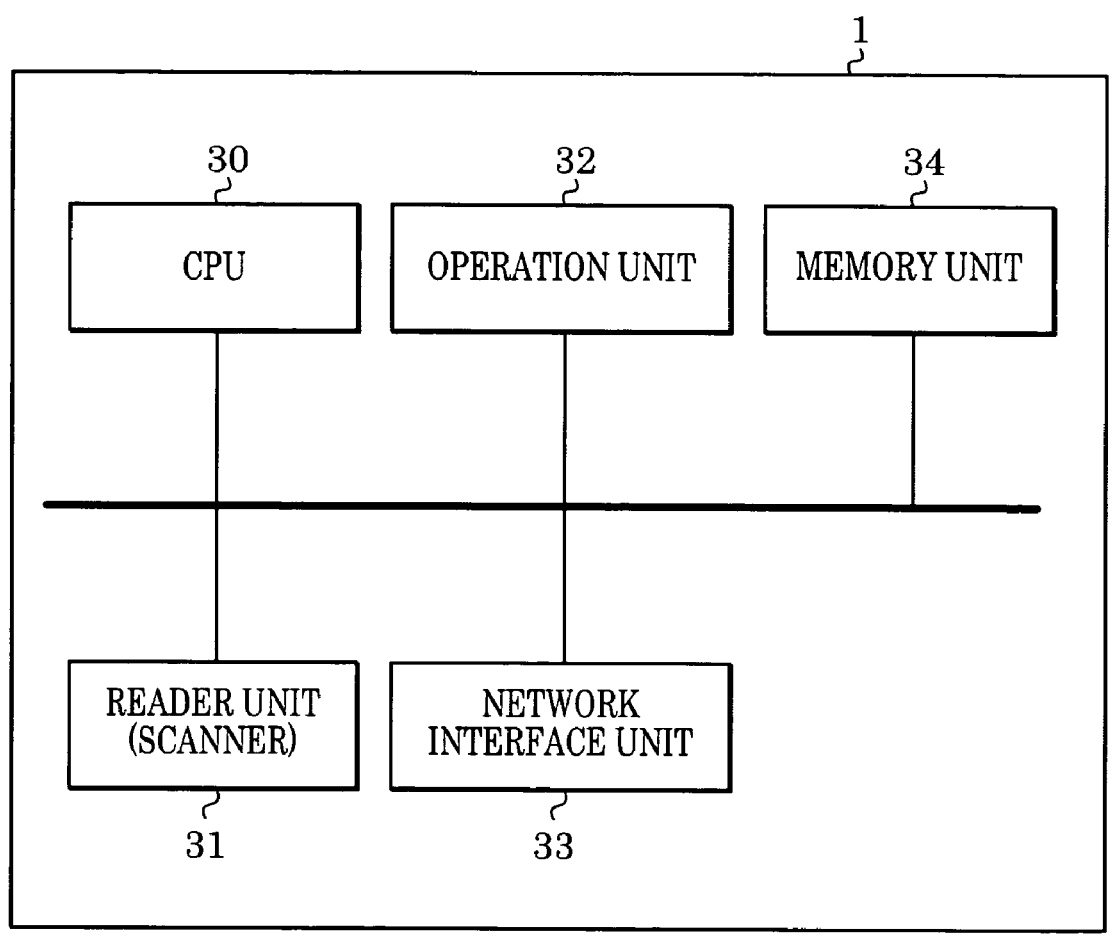
FIG. 7 is a schematic block diagram of the hardware configuration of an image processing system according to a second embodiment of the present invention.

FIG. 7 is a schematic block diagram of the hardware configuration of an image processing system according to the second embodiment of the present invention.

Referring to FIG. 7, the MFP 1 serving as the image processing system includes a CPU 30, a reader unit (scanner) 31, an operation unit 32, a network interface unit 33, and a memory unit 34.

The CPU 30 controls the operations of the respective units included in the MFP 1. The reader unit 31 serves as a scanner for reading a document or a photograph as an image. The reader unit 31 has an auto document feeder (ADF) through which a plurality of documents can be successively read.

The operation unit 32 includes keys and buttons, which can be operated by an MFP user, and an LED and an LCD serving as displays. The network interface unit 33 is connected to the network 10 to transmit and receive data.

The memory unit 34 includes a RAM, a ROM, and an HDD to store data and a program of a process, which will be described below. The memory unit 34 also temporarily stores image data and serves as a work area in generating thumbnails of image data.

Figure 8:
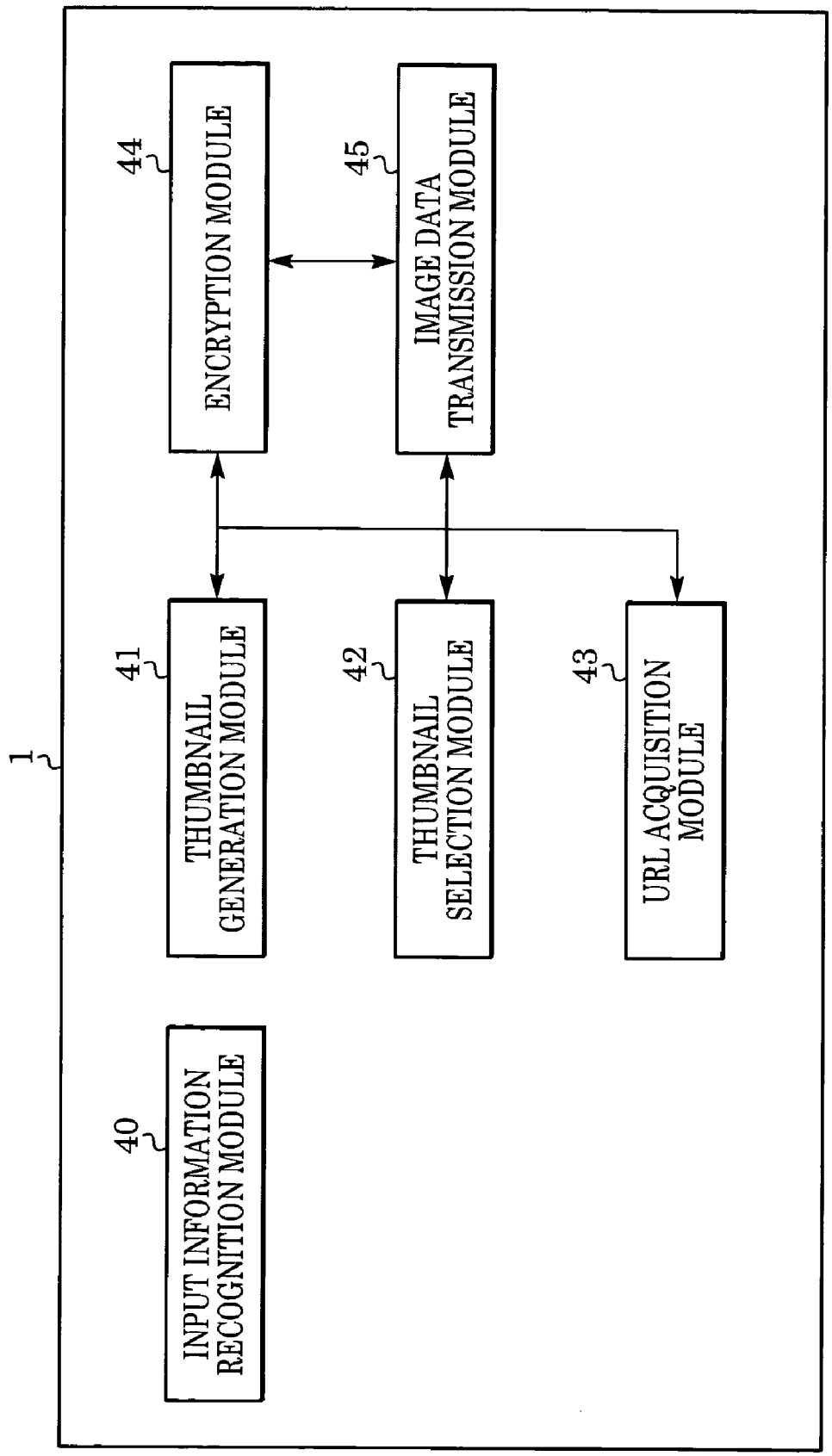
FIG. 8 is a schematic block diagram of the software configuration of the MFP in FIG. 7.

FIG. 8 is a schematic block diagram of the software configuration of the MFP 1 in FIG. 7.

Referring to FIG. 8, the MFP 1 includes an input information recognition module 40, a thumbnail generation module 41, a thumbnail selection module 42, a URL acquisition module 43, an encryption module 44, and an image data transmission module 45.

Figure 9:
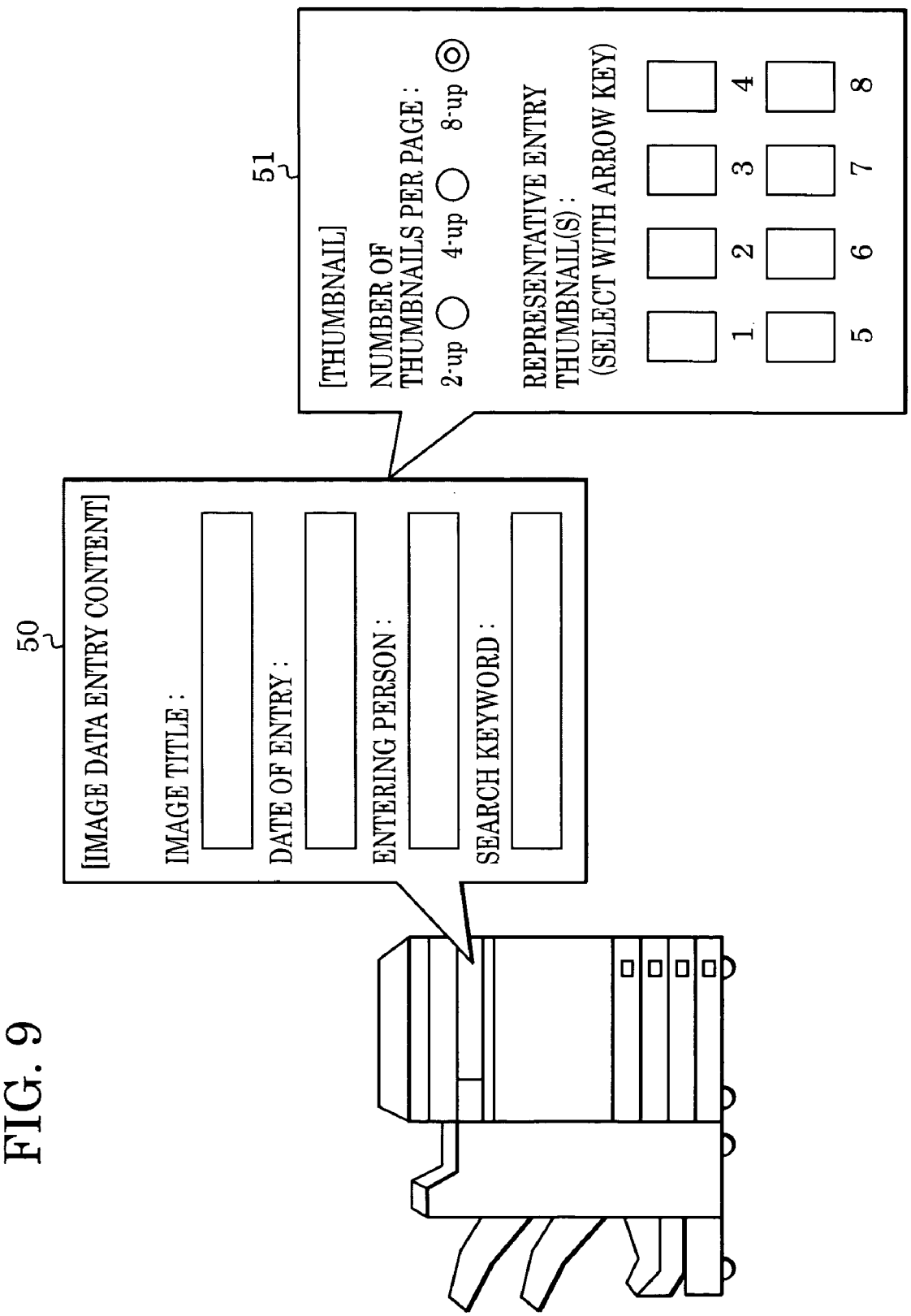
FIG. 9 is a diagram showing an example of a screen displayed on an operation unit of the MFP in FIG. 7.

Referring to FIG. 9, the input information recognition module 40 has a function for recognizing the content of image information input on an image data entry content screen 50, which is displayed in the operation unit 32 upon image data entry. Image information pertains to an image read through the reader unit 31 and includes, for example, "image title", "date of entry", "entering person", and "search keyword". After completion of entry, image data in the digital image data DB 5 is searched using its "search keyword". The "search keyword" includes the characteristics of an entry image.

The thumbnail generation module 41 has a function for generating thumbnails of image data of documents read by the reader unit 31. When a plurality of documents are successively read, the thumbnail generation module 41 specifies the number of thumbnails arranged in one page. Referring to FIG. 9, the number of thumbnails per page can be specified on a thumbnail screen 51. For example, when 2-up layout is selected, two thumbnails corresponding to two pages are arranged per page. When 4-up layout is selected, four thumbnails corresponding to four pages are arranged per page. In other words, when documents of 16 pages are successively read and 4-up layout is selected, four page images each including four thumbnails are generated.

The thumbnail selection module 42 has a function for selecting one or a plurality of representative thumbnails from among thumbnails generated by the thumbnail generation module 41 on the thumbnail screen 51. At least one representative thumbnail can be selected using an arrow key and a selection key in the operation unit 32. This prevents selection of the first page of documents as a representative thumbnail when the documents are successively read and thumbnails corresponding to the documents are entered into the DRM server 4.

The thumbnail selection module 42 also has a function for changing the number of selectable thumbnails according to the specified number of thumbnails. For example, when 4-up layout is selected, four thumbnails are displayed on the first page. Thus, four thumbnails are selected as representative thumbnails.

The URL acquisition module 43 has a function for acquiring a URL as identification information to identify image data stored in the memory unit 34. The encryption module 44 has a function for encrypting thumbnails and image data of read documents before the data is transmitted to the DRM server 4. The image data transmission module 45 transmits data encrypted by the encryption module 44 to the DRM server 4.

An image data entry process executed by the image processing system including the image processing system of the second embodiment of the present invention will now be described with reference to FIGS. 10 and 11.

Figure 10:
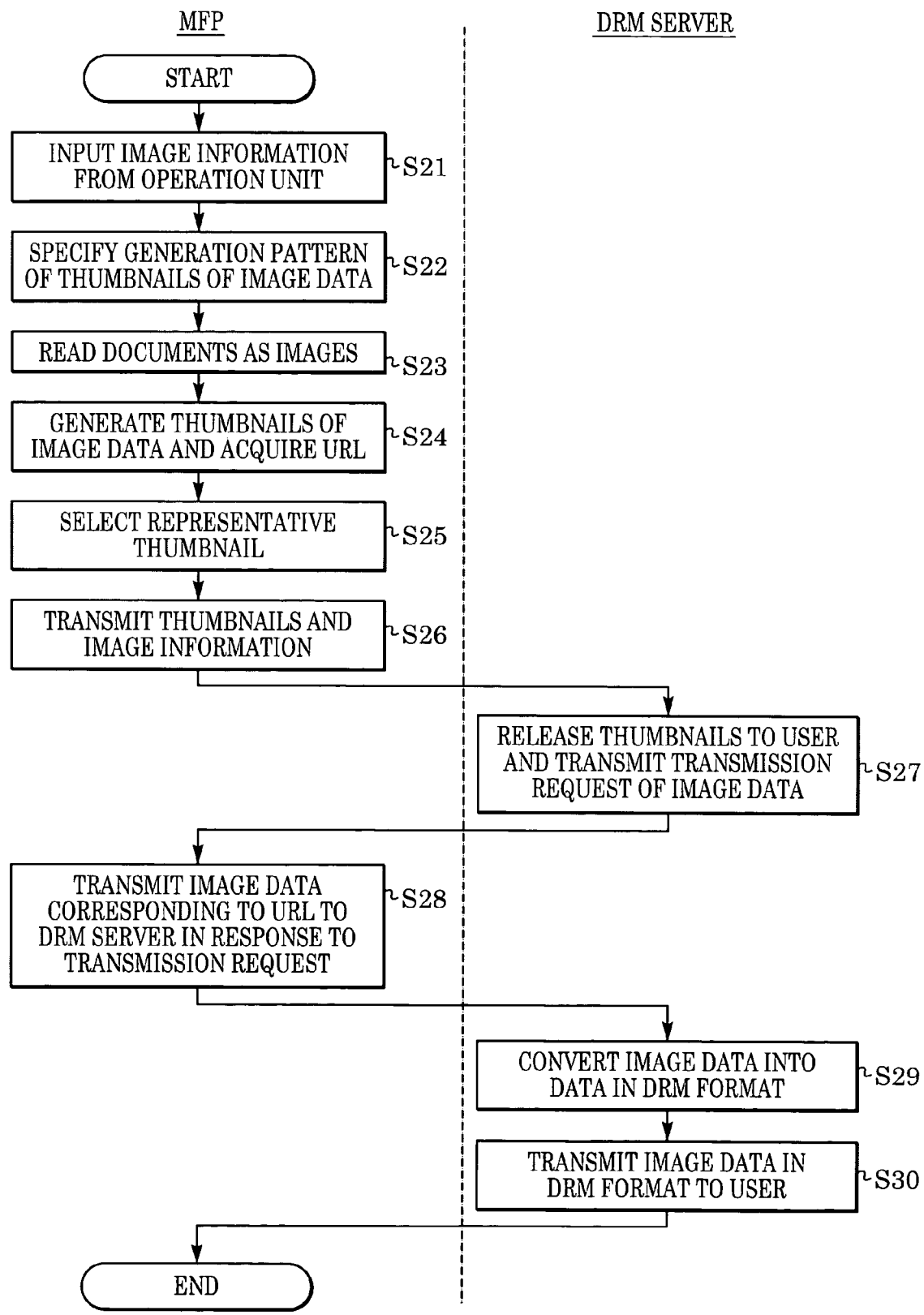
FIG. 10 is a flowchart of an image data entry process executed in an image processing system including the MFP 1 of FIG. 7.

FIG. 10 is a flowchart of the image data entry process executed by the image processing system having the MFP 1 of FIG. 7. FIG. 11 is a diagram showing the flow of image data in the process of FIG. 10.

Referring to FIG. 10, in the MFP 1, when the MPF user inputs image information, related to image data of documents to be read through the reader unit 31, on the image data entry content screen 50 displayed in the operation unit 32, the input information recognition module 40 recognizes the input image information (step S21).

Subsequently, the MFP user specifies a thumbnail generation pattern (the specification of the number of thumbnails per page and the selection of at least one representative thumbnail) on the thumbnail screen 51 (step S22) (S22 of FIG. 11). Thus, the reader unit 31 reads documents as images, adds a URL to data of the read images, and then stores the image data into the memory unit 34 (step S23) (S23 of FIG. 11). The image data can be encrypted by the encryption module 44 and be then stored in the memory unit 34.

The thumbnail generation module 41 generates thumbnails of the image data stored in the memory unit 34 based on the thumbnail generation pattern specified in step S22. The URL acquisition module 43 acquires the URL of the image data stored in the memory unit 34 (step S24).

The thumbnail selection module 42 selects at least one representative thumbnail, which may be needed for entry in the DRM server 4, according to the specification in step S22 (step S25).

The encryption module 44 encrypts thumbnails generated according to the selected information (fundamentally, some selected thumbnails are sequentially arranged from the top), the input image information, and the acquired URL. After that, the image data transmission module 45 transmits the encrypted data to the DRM server 4 (step S26) (S26 of FIG. 11).

The DRM server 4 releases the thumbnails received from the MFP 1 to a purchaser (user 2). When the purchaser of the image data is determined, the DRM server 4 designates the URL of the corresponding image data to the MFP 1 and requests the transmission of the image data (step S27).

Figure 11:
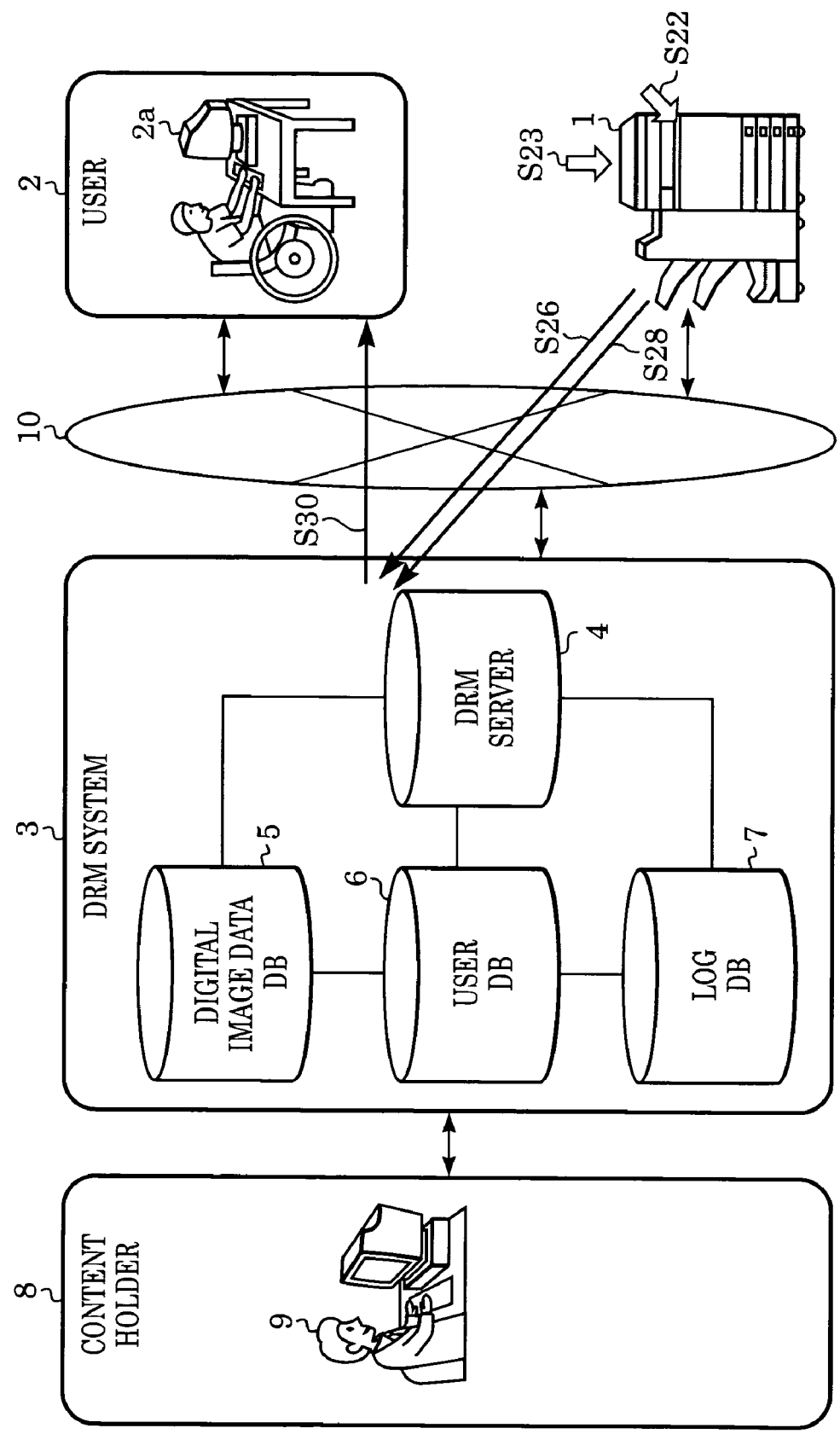
FIG. 11 is a diagram showing the flows of image data in the process of FIG. 10.

In response to the transmission request of the image data from the DRM server 4, the MFP 1 obtains the image data corresponding to the designated URL from the memory unit 34 and then transmits the image data to the DRM server 4 (step S28) (S28 of FIG. 11).

The DRM server 4 converts the image data received from the MFP 1 into data in the DRM format (step S29) and then transmits the converted image data in the DRM format to the user 2 (step S30) (S30 of FIG. 11) after which the present process terminates.

According to the second embodiment, thumbnails of image data of documents or photographs read through the reader unit 12 are generated in the MFP 1. Then, the generated thumbnails, image information related to the image data, and the URL indicating the storage location of the image data are transmitted from the MFP 1 to the DRM server 4. In response to an image data transmission request from the DRM server 4, image data is transmitted from the MFP 1 to the DRM server 4. In other words, similar to the first embodiment, image data of documents read through the MFP 1 can be protected from copyright violations with the DRM system 3 for preventing the unauthorized copying and use of image data. Image data can be managed according to the operation of the existing DRM system 3. The MFP user can easily generate, distribute, and/or enter image data through the operation unit 13 in the MFP 1.

A storage medium, containing program code for implementing functions described in the above embodiments, may be provided to the system. The program code can be read from the storage medium through a computer such as a CPU or an MPU of the system. The program code can then be executed to implement the functions. In this case, the program code, read from the storage medium, realizes the functions according to the above embodiments.

The storage medium such as a floppy disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, or a ROM can be used for providing the program code.

In addition to the case where the program code read through the computer is executed to realize the functions according to the above-mentioned embodiments, the present invention further includes a case where an operating system (OS), running on the computer, performs a part or an entire actual process in accordance with instructions based on the program code to implement the functions according to the above embodiments.

Furthermore, the program code read from the storage medium may be written into a function expansion board inserted in the computer or a memory included in a function expansion unit connected to the computer, and a part or an entire actual process is executed through a CPU included in the function expansion board or unit in accordance with instructions based on the program code to realize the functions according to the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing system capable of communicating with a server for protecting content of data, the system comprising:

a reading unit configured to read an image;

a destination specifying unit configured to allow a user to specify the destination of data of the image read through the reading unit;

a first data transmitting unit configured to transmit the data of the image read through the reading unit to the server;

a data receiving unit configured to receive the data of which a copyright is protected by the server; and a second data transmitting unit configured to transmit the data received through the data receiving unit to the destination specified by the user.

2. The system according to claim 1, further comprising:

a data generating unit configured to generate data of the image read through the reading unit; and an encrypting unit configured to encrypt the generated data, wherein the first data transmitting unit transmits the data encrypted through the encrypting unit to the server.

3. The system according to claim 1, further comprising:

a display unit configured to display a screen to prompt the user to determine whether the data of which a copyright is protected is entered into the server.

4. The system according to claim 1, wherein the destination specifying unit displays a screen to input the destination in order to prompt the user to specify the destination.

5. An image processing system connected to a server for protecting content of data, the data being provided to a user, the system comprising:
- a reading unit configured to read images;
- a thumbnail generating unit configured to generate thumbnails of data of the read images;
- an image information input unit configured to input image information related to the read images;
- a data storage unit configured to store the data of the read images;
- an identification information obtaining unit configured to obtain identification information to identify the stored data;
- a transmitting unit configured to transmit the generated thumbnails, the input image information, and the obtained identification information to the server; and
- a data transmitting unit configured to read out, in response to a request from the server, the data corresponding to the transmitted identification information from the data storage unit and then transmit the data through the server to the user.

6. The system according to claim 5, further comprising:
- an encrypting unit configured to encrypt the generated thumbnails, the input image information, and the obtained identification information,
- wherein the transmitting unit transmits the encrypted thumbnails, image information, and identification information to the server.

7. An image processing method for an image processing system capable of communicating with a server for protecting content of data, the data being provided to a user, the method comprising:
- a reading step of reading an image;
- a destination specifying step of allowing a user to specify the destination of data of the image read in the reading step;
- a first data transmitting step of transmitting the data of the image read in the reading step to the server;
- a data receiving step of receiving the data of which a copyright is protected by the server, from the server; and
- a second data transmitting step of transmitting the data received in the data receiving step to the destination specified by the user.

8. The method according to claim 7, further comprising:
- a data generating step of generating data of the image read in the reading step; and
- an encrypting step of encrypting the generated data, wherein
- in the first data transmitting step, the data encrypted in the encrypting step is transmitted to the server.

9. The method according to claim 7, further comprising:
- a display step of displaying a screen to prompt the user to determine whether the data of which a copyright is protected is entered into the server.

10. The method according to claim 7, wherein in the destination specifying step, a screen to input the destination is displayed in order to prompt the user to specify the destination.

11. An image processing method for an image processing system connected to a server for protecting content of data, the data being provided to a user, the method comprising:
- a reading step of reading images;
- a thumbnail generating step of generating thumbnails of data of the read images;
- an image information input step of inputting image information related to the read images;
- a data storing step of storing the data of the read images;
- an identification information obtaining step of obtaining identification information to identify the stored data;
- a transmitting step of transmitting the generated thumbnails, the input image information, and the obtained identification information to the server; and
- a data transmitting step of reading out, in response to a request from the server, the data corresponding to the transmitted identification information from a data storage unit and then transmitting the data through the server to the user.

12. The method according to claim 11, further comprising:
- an encrypting step of encrypting the generated thumbnails, the input image information, and the obtained identification information,
- wherein, in the transmitting step, the encrypted thumbnails, image information, and identification information are transmitted to the server.

13. An image processing and distribution system comprising:
- a multifunction unit comprising
  - a reading unit configured to read an image;
  - a destination specifying unit configured to allow a user to specify a destination device for image data of the image read through the reading unit;
- a server configured to receive the image data and convert said image data into a predetermined format that is capable of preventing unauthorized duplication of the image, the server protecting a copyright of the read image; and
- a data transmitting unit configured to transmit the image data converted by the server to the destination device specified by the user.

14. The system according to claim 13 wherein the multifunction unit further comprises:
- a data generating unit configured to generate data of the image data; and
- an encrypting unit configured to encrypt the generated data, wherein the data transmitting unit transmits the data encrypted through the encrypting unit to the server.

* * * * *